United States Patent
Park

(10) Patent No.: US 9,830,070 B2
(45) Date of Patent: Nov. 28, 2017

(54) DISPLAY APPARATUS AND METHOD FOR CONTROLLING THE SAME

(71) Applicant: Samsung Display Co., Ltd., Yongin (KR)

(72) Inventor: Sukjae Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 231 days.

(21) Appl. No.: 14/715,714

(22) Filed: May 19, 2015

(65) Prior Publication Data

US 2016/0110018 A1 Apr. 21, 2016

(30) Foreign Application Priority Data

Oct. 16, 2014 (KR) .................. 10-2014-0140177

(51) Int. Cl.
*G06F 3/041* (2006.01)
*G06F 3/0488* (2013.01)

(52) U.S. Cl.
CPC .................. *G06F 3/0488* (2013.01)

(58) Field of Classification Search
CPC .................................. G06F 3/0488
See application file for complete search history.

(56) References Cited

U.S. PATENT DOCUMENTS

| | | | |
|---|---|---|---|
| 2012/0038572 A1* | 2/2012 | Kim | G06F 3/0418 345/173 |
| 2012/0044179 A1 | 2/2012 | Hudson | |
| 2013/0053107 A1 | 2/2013 | Kang et al. | |
| 2013/0321287 A1* | 12/2013 | Adamson | G06F 3/041 345/173 |
| 2013/0328805 A1 | 12/2013 | Kim | |
| 2014/0327630 A1* | 11/2014 | Burr | G06F 3/0488 345/173 |

FOREIGN PATENT DOCUMENTS

| | | |
|---|---|---|
| KR | 10-2012-0015968 | 2/2012 |
| KR | 10-2013-0023943 | 3/2013 |
| KR | 10-2013-0043229 | 4/2013 |
| KR | 10-2013-0048960 | 5/2013 |
| KR | 10-2013-0138880 | 12/2013 |
| KR | 10-2014-0058977 | 5/2014 |

* cited by examiner

*Primary Examiner* — Ilana Spar
*Assistant Examiner* — Brent D Castiaux
(74) *Attorney, Agent, or Firm* — H.C. Park & Associates, PLC

(57) ABSTRACT

A display apparatus includes: a request receiving unit configured to receive a deactivation request signal to deactivate touch input signals; an area distinguishing unit configured to divide a display area of the display apparatus into a first area and a second area; a mode determining unit configured to determine whether an operation mode of the display apparatus is a motion picture playback mode; and an input receiving unit configured to process touch operations based on the association from the area distinguishing unit, the operation mode of the display apparatus, and the deactivation request signal.

20 Claims, 6 Drawing Sheets

DISPLAY APPARATUS AND METHOD FOR CONTROLLING THE SAME

CROSS REFERENCE TO RELATED APPLICATION

This application claims priority from and the benefit under 35 U.S.C. §119(a) of Korean Patent Application No. 10-2014-0140177, filed on Oct. 16, 2014, which is incorporated herein by reference as if fully set forth herein.

BACKGROUND

Field

One or more exemplary embodiments relate to a display apparatus and method for controlling the display apparatus.

Discussion of the Background

A touch-type display apparatus can allow a users to watch a motion picture, such as a YouTube video. However, unintended touch operations can interrupt playback of the motion picture.

SUMMARY

One or more exemplary embodiments include a display apparatus and a display apparatus controlling method for reducing or preventing interruption from an unintended touch operation during playback of a motion picture.

Additional aspects will be set forth in part in the detailed description which follows and, in part, will be apparent from the description, or may be learned by practice of the presented embodiments.

According to one or more exemplary embodiments, a display apparatus includes: a request receiving unit configured to receive a deactivation request signal to deactivate touch input signals; an area distinguishing unit configured to divide a display area of the display apparatus into a first area and a second area; a mode determining unit configured to determine whether an operation mode of the display apparatus is a motion picture playback mode; and an input receiving unit configured to process touch operations based on the association from the area distinguishing unit, the operation mode of the display apparatus, and the deactivation request signal.

According to one or more exemplary embodiments, a method of controlling a display apparatus, the method includes receiving a deactivation request signal to deactivate touch input signals; dividing a display area of the display apparatus into a first area and a second area; determining whether an operation mode of the display apparatus is a motion picture playback mode or a non-motion picture playback mode; and deactivating touch input signals, wherein the display apparatus is configured to deactivate touch input signals by processing touch operations based on the association from the display area, the operation mode, and the request signal.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments, and, together with the description, serve to explain principles of the inventive concept.

DETAILED DESCRIPTION OF THE ILLUSTRATED EMBODIMENTS

Figure 1:
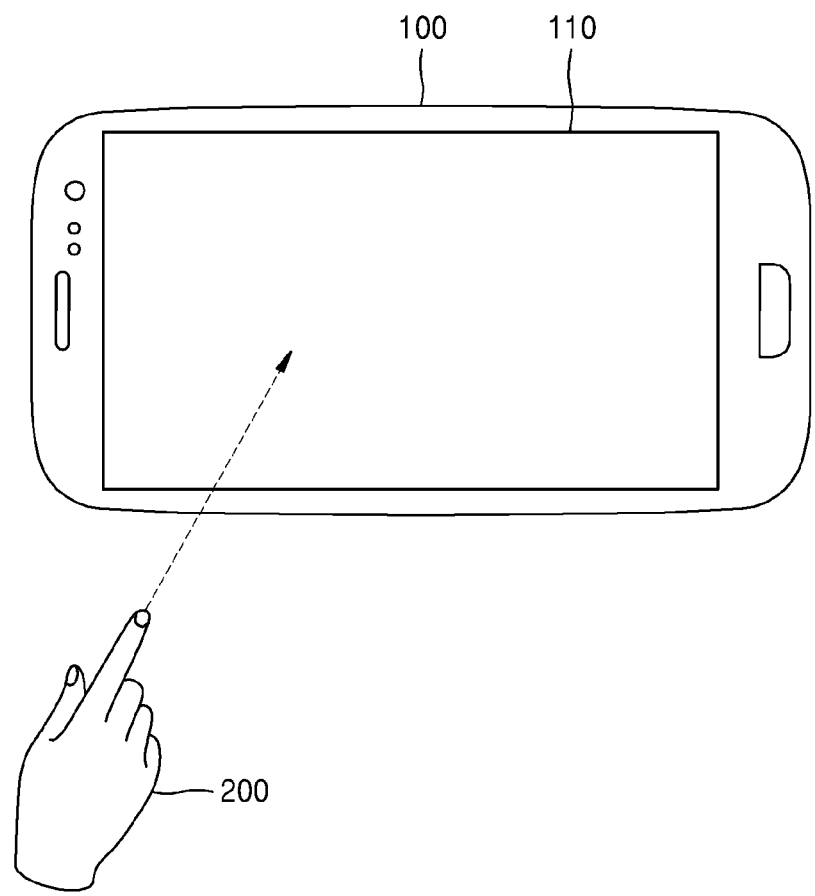
FIG. 1 is a diagram schematically showing a display apparatus, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to plan and/or sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. Likewise, the regions illustrated in the drawings are schematic in nature and their shapes are not intended to illustrate the actual shape of a region of a device and are not intended to be limiting Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a diagram schematically showing a display apparatus, according to one or more exemplary embodiments.

Referring to FIG. 1, display apparatus 100 includes display area 110. User 200 may perform a touch operation on display area 110, and display apparatus 100 may receive a touch input signal by converting the corresponding touch operation into an electric signal. A touch operation may include a physical contact from user 200 to display area 110 by using a particular body part and/or a tool and an air gesture of user 200 with respect to display area 110, e.g., a gesture of user 200 performed in proximity to display apparatus 100.

Display apparatus 100 may be a flat-panel display apparatus, including an organic light emitting diode (OLED) display, a thin-film transistor liquid crystal display (TFT-LCD), a plasma display panel (PDP), and an light emitting diode (LED) display. However, exemplary embodiments are not limited thereto, and the display apparatus 100 may be any of various apparatuses configured to receive video signals and display corresponding images. For example, display apparatus 100 may be an electronic apparatus, including a smart phone, a personal computer (PC), a laptop PC, a monitor, and a TV, and an image displaying part for such electronic apparatuses.

Display area 110 corresponds to an area in which an image may be displayed. Display area 110 may be a portion of a flat-panel display panel, such as an OLED panel and/or a liquid crystal (LC) panel. However, exemplary embodiments are not limited thereto.

User 200 may correspond to a person, or some intermediary element, interacting with the display apparatus 100. User 200 may control the display apparatus 100 by providing a touch operation to display area 110 of display apparatus 100.

Figure 2:
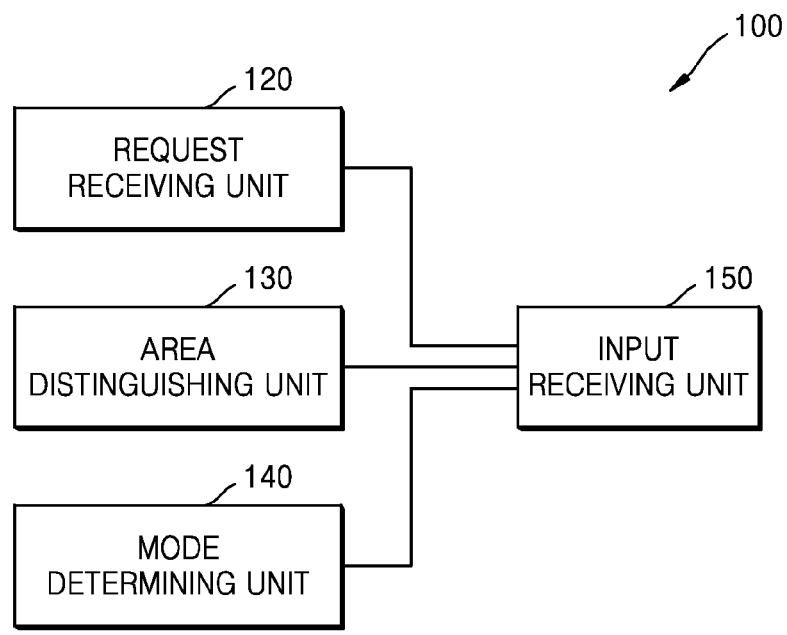
FIG. 2 is a schematic block diagram showing an exemplary configuration of a display apparatus, according to one or more exemplary embodiments.

FIG. 2 is a schematic block diagram showing an exemplary configuration of a display apparatus, according to one or more exemplary embodiments.

Referring to FIG. 2, display apparatus 100 may include request receiving unit 120, area distinguishing unit 130, mode determining unit 140, and input receiving unit 150.

Request receiving unit 120 is configured to receive a deactivation request signal for deactivating touch input signals from the user 200 based on an operation mode of display apparatus 100. The deactivation request signal may be a touch input signal with respect to a portion of display area 110 or a signal generated via a switch located at the front surface, a side surface, and/or the rear surface of display apparatus 100. The deactivation request signal may be generated by display apparatus 100 according to an algorithm included thereof. For example, if no touch input signal is received for a designated period of time after playback of a motion picture, a deactivation request signal may be generated. Request receiving unit 120 may be configured to receive a global deactivation request signal from user 200 for deactivating touch input signals regardless of operation modes.

Area distinguishing unit 130 is configured to divide the display area 110 into sets of areas, such as a first area and a second area. For example, the entire display area 110 may be divided into the first area and the second area, and display area 110 may include an area other than the first area and the second area. The entire display area 110 may also include only one or either the first area or the second area. Display area 110 may include a third area other than the first area and the second area. Display area 110 can include undefined areas.

Mode determining unit 140 may be configured to determine whether an operation mode of the display apparatus 100 is a motion picture playback mode. A motion picture playback mode may refer to a state that a motion picture, including, for example, a video in a .jpeg format or an animated image in .gif format, is being displayed in display area 110. Mode determining unit 140 may be configured to determine that display apparatus 100 is in the motion picture playback mode in response to detecting that a motion picture is displayed in the entire area of display area 110, or in a response to detecting a motion picture displayed in a portion of display area 110. Mode determining unit 140 may be configured to determine that display apparatus 100 is in the motion picture playback mode in response to detecting that a motion picture file stored in display apparatus 100 is being played back, a motion picture on a web page or portion of a web page, and/or an animated image file, is being displayed in display area 110. However, the exemplary embodiments are not limited thereto, and mode determining unit 140 may be configured to determine that display apparatus 100 is in the motion picture playback mode in response to detecting that an animated image is displayed in display area 110. Mode determining unit 140 may also be configured to determine that display apparatus 100 is in the motion picture playback mode in response to detecting that a motion picture particularly requested by user 200 is displayed in display area 110. The mode determining unit 140 may also be configured to exclude from determining that display apparatus 100 is in the motion picture playback mode. For example, when a motion picture advertisement automatically played back on an internet web page is displayed in display area 110, mode determining unit may refrain from indicating that the operation mode is a motion picture playback mode.

Mode determining unit 140 may be configured to determine that the operation mode of display apparatus 100 is a non-motion picture playback mode. The non-motion picture playback mode may refer to a state that no motion picture is being played back in display area 110. Mode determining unit 140 may be configured to determine that display apparatus 100 is in the non-motion picture playback mode in response to detecting that no motion in an image is displayed in display area 110, or in response to detecting that a motion picture is displayed in only a portion of display area 110. Mode determining unit 140 may be configured to determine that display apparatus 100 is in the non-motion picture playback mode in response to detecting that a motion picture not particularly requested by user 200 for playback is displayed in display area 110. For example, mode determining unit 140 may be configured to determine that display apparatus 100 is in the non-motion picture playback mode in response to detecting that a motion picture advertisement automatically played back on an internet web page is displayed in display area 110.

Input receiving unit 150 is configured to produce a touch input signal by converting a touch operation performed by user 200 on display area 110 into corresponding electric signals. Input receiving unit 150 may be configured to deactivate producing touch input signals in response to receiving, for example, corresponding request signals and/or determining corresponding operation modes. The deactivation can be for all or part of display area 110. When touch input signals are deactivated, input receiving unit 150 may be configured to not process touch input signals corresponding to the touch operation by user 200 performed at locations corresponding to where touch input signals are deactivated. In response to receiving a deactivation request signal and determining that the operation mode is the motion picture playback mode, input receiving unit 150 may be configured to deactivate touch input signals with respect to an area of display area 110. Therefore, exemplary embodiments may reduce possible interruptions from unintended touch input signals, such as from holding display apparatus 100, during playback of the motion picture. Input receiving unit 150 may be configured to not deactivate touch input signals with respect to other areas in response to determining that the operation mode is the motion picture playback mode. Therefore, stopping, playing, fast-forwarding, and rewinding of the motion picture may be performed via touch operations with respect to the other areas without activating touch operations with respect to the entire display area 110. When a deactivation request signal is received and the operation mode is detected as the non-motion picture playback mode, input receiving unit 150 may be configured to activate touch input signals with respect to the entire display area 110. When a global deactivation request signal is received, input receiving unit 150 may be configured to deactivate touch input signals with respect to the entire display area 110 regardless of the operation mode.

When a deactivation request signal is received and the operation mode is detected as the motion picture playback mode, input receiving unit 150 may be configured to deactivate at least one of buttons disposed on display apparatus 100. For example, if display apparatus 100 is a smart phone, display apparatus 100 may include a home button, volume adjusting buttons, a power button, etc. Input receiving unit 150 may be configured to deactivate the home button and the power button in response to receiving the deactivation request signal. Therefore, exemplary embodiments may reduce possible interruptions from unintentional operations of buttons, such as from holding display apparatus 100 during playback of the motion picture.

Referring back to FIG. 2, request receiving unit 120, area distinguishing unit 130, mode determining unit 140, and input receiving unit 150 are shown as independent blocks. However, the exemplary embodiments are not limited thereto, and all and/or some of request receiving unit 120, area distinguishing unit 130, mode determining unit 140, and input receiving unit 150 may be implemented as a single block.

Figure 3:
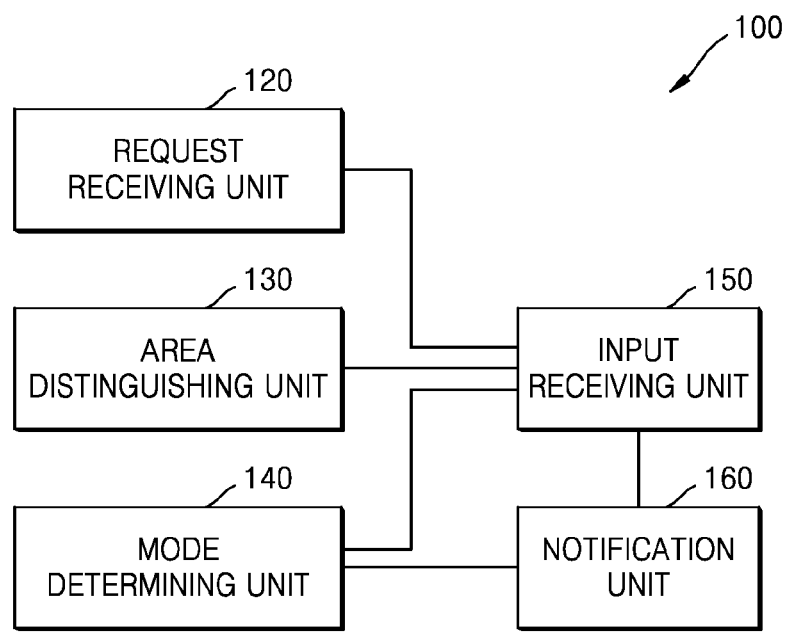
FIG. 3 is a schematic block diagram showing an exemplary configuration of a display apparatus, according to one or more exemplary embodiments.

FIG. 3 is a schematic block diagram showing an exemplary configuration of display apparatus 100, according to one or more exemplary embodiments.

Referring to FIG. 3, display apparatus 100 according to the exemplary embodiment includes request receiving unit 120, area distinguishing unit 130, mode determining unit 140, input receiving unit 150, and notification unit 160.

The exemplary embodiment shown in FIG. 3 includes substantially similar elements compared to the exemplary embodiment shown in FIG. 2 except for some additional components. Following descriptions will focus on the additional components.

Notification unit 160 is configured to produce an indication of deactivation of touch input signals based on a signal from the input receiving unit. Notification unit 160 may be configured to produce an indication of deactivation of touch input signals by displaying an image and/or a text at display area 110. Notification unit 160 may be configured to indicate the deactivation of touch input signals by using sounds. Notification unit 160 may be configured to indicate the deactivation of touch input signals while display apparatus 100 is in the non-motion picture playback mode, and may be configured to not indicate the deactivation of touch input signals (deactivated) based on a determination that display apparatus 100 is in the motion picture playback mode. Therefore, possible interruptions by the notifications during playback of the motion picture.

In exemplary embodiments, request receiving unit 120, area distinguishing unit 130, mode determining unit 140, input receiving unit 150, notification unit 160, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, request receiving unit 120, area distinguishing unit 130, mode determining unit 140, input receiving unit 150, notification unit 160, and/or one or more components thereof may include or otherwise be associated with one or more memories (not shown) including code (e.g., instructions) configured to cause request receiving unit 120, area distinguishing unit 130, mode determining unit 140, input receiving unit 150, notification unit 160, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

FIGS. 4A, 4B, 4C, and 4D are schematic diagrams showing examples of dividing a display area into a first area and a second area in a display apparatus, according to one or more exemplary embodiments.

Figure 4A:
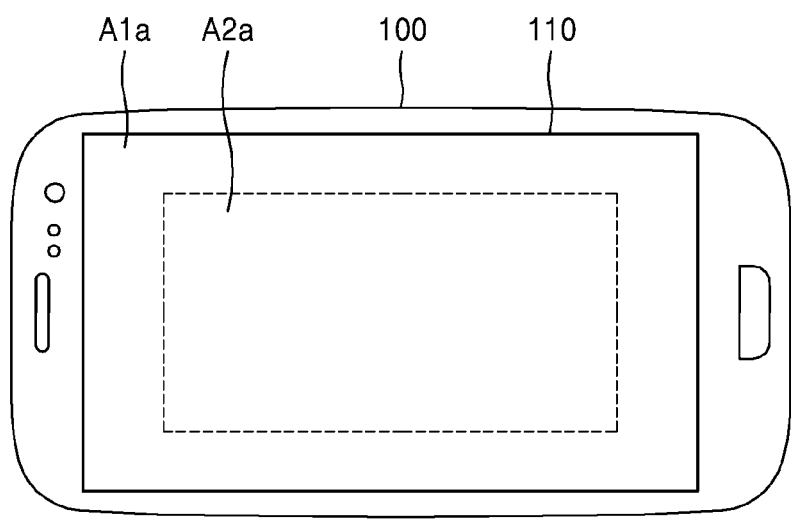
FIGS. 4A, 4B, 4C, and 4D are schematic diagrams showing examples of dividing a display area into a first area and a second area in a display apparatus, according to one or more exemplary embodiments.

Referring to FIG. 4A, display area 110 of display apparatus 100 is divided into first area A1a and second area A2a. First area A1a may be an area within a first distance from each edges of display area 110. For example, the first distance may be 1.5 cm, and first area A1a may include a rectangular frame-shaped area having width of 1.5 cm at edges of display area 110. In display area 110, second area A2a may include a rectangular area surrounded by first area A1a. Therefore, exemplary embodiments may reduce possible interruptions from unintended touch input signals at the edges of display area 110 during watching the motion picture, may be reduced.

Referring to FIG. 4A, first area A1a includes an area within the first distance from the four edges of display area 110. However, the exemplary embodiments are not limited thereto, and first area A1a may include an area within difference distances respectively from the upper edge, the lower edge, the right edge, and the left edge.

Figure 4B:
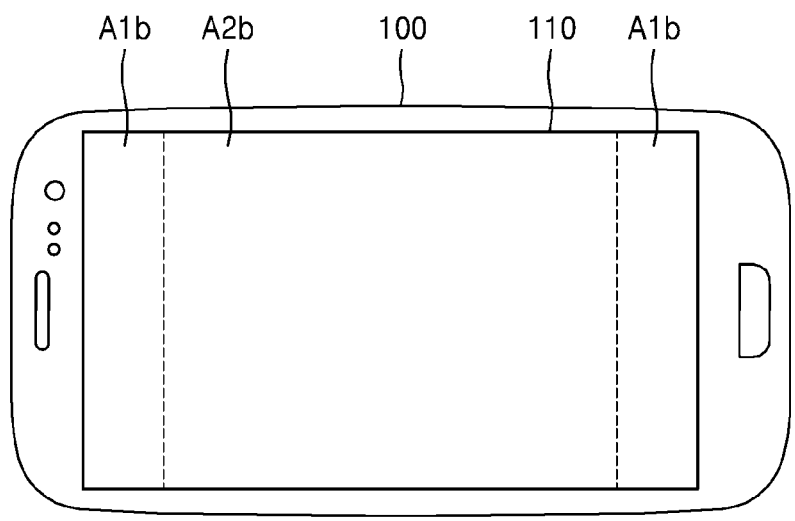

Referring to FIG. 4B, display area 110 of display apparatus 100 is divided into first areas A1b and a second area A2b. First areas A1b may include an area within a second distance from the upper edge and the lower edge of display area 110. For example, the second distance may be 1.5 cm, and first areas A1b may include two rectangular areas having a width of 1.5 cm each respectively disposed at the upper edge and the lower edge of display area 110. Accordingly, second area A2b may include a rectangular area disposed between first areas A1b. Therefore, possible interruptions due to unintended touch input signals at two opposite edges of display area 110 may be reduced.

Referring to FIG. 4B, first areas A1b includes areas within the same second distance from the upper edge and the lower edge. However, the exemplary embodiments are not limited thereto, and first areas A1b may include areas within different distances respectively from the upper edge and the lower edge of display area 110.

Figure 4C:
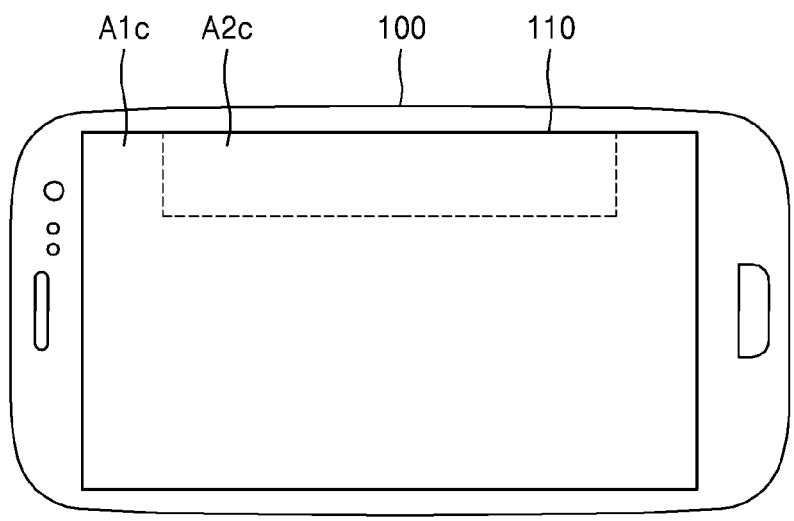

Referring to FIG. 4C, display area 110 is divided into first area A1c and second area A2c. Second area A2c may be a rectangular area sharing a part of an edge of display area 110 as an edge. For example, as shown in FIG. 4C, second area A2c may be a rectangular area of which a side is a part of an edge of display area 110. The first area A1c may include a portion of display area 110 other than second area A2c. Therefore, most of display area 110 may be configured as a touch-deactivated area.

Referring to FIG. 4C, second area A2c includes a rectangular area of which a side is a part of an edge of display area 110. However, the exemplary embodiments are not limited thereto, and second area A2c may include a rectangular area of which a side is an entire edge of display area 110, and/or a rectangular area of which a first side is a part of a first edge of display area 110 and a second side is a part of a second edge of display area 110 meeting the first edge at a point.

Figure 4D:
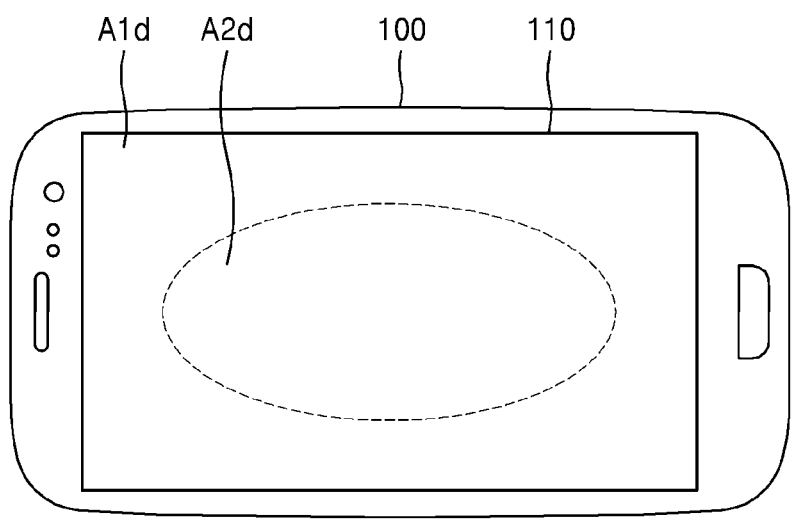

Referring to FIG. 4D, display area 110 of display apparatus 100 may be divided into first area A1d and second area A2d. Second area A2d may include an area inside an ellipse around the center of display area 110. For example, as shown in FIG. 4D, second area A2d may include an elliptical area at the center of display area 110, and first area A1d may include the portion of display area 110 other than second area A2d. Therefore, possible interruptions from unintended touch input signals at the edges of display area 110 during watching the motion picture may be reduced.

User 200 may specifically designate the first area of display apparatus 100. For example, user 200 may designate an area having a particular shape by providing designation input signals via touch input signals, and the designated area may become the first area, and the area of display area 110 not designated by user 200 becomes a second area. User 200 may designate an area having a particular shape by providing designation input signals via touch input signals, and the designated area may become a second area, and the area of display area 110 not designated by user 200 becomes a first area. Therefore, user 200 may designate an area for touch input signal deactivation to have various shapes.

According to exemplary embodiments, dividing display area 110 into a first area and a second area are not limited to exemplary embodiments illustrated in FIGS. 4A, 4B, 4C, and 4D, and display area 110 may be divided into areas of various forms.

Figure 5A:
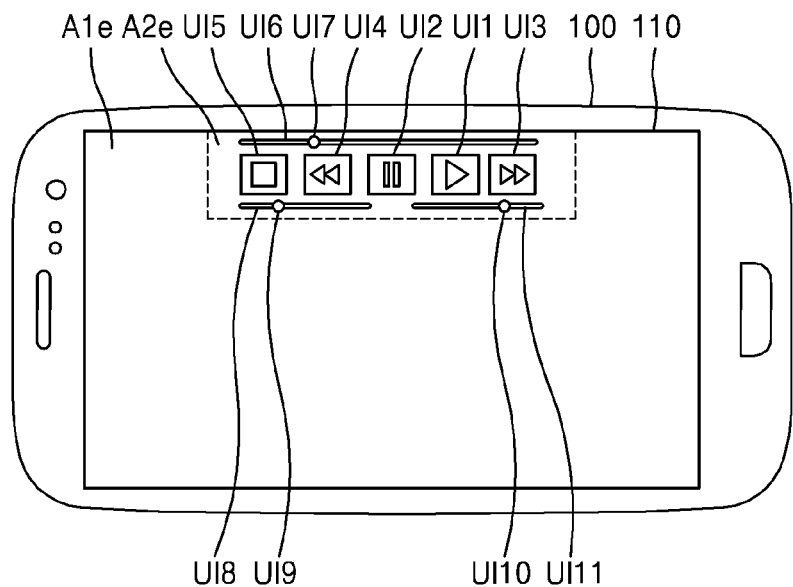
FIGS. 5A and 5B are schematic diagrams showing exemplary methods of receiving control requests for controlling a display apparatus via a second area, according to one or more exemplary embodiments.
Figure 5B:
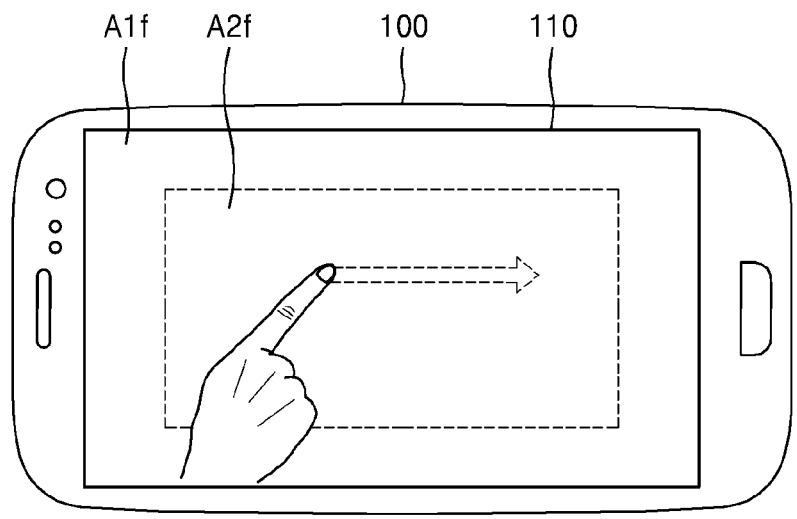

FIGS. 5A and 5B are schematic diagrams showing exemplary methods of receiving control requests for controlling a display apparatus via a second area, according to one or more exemplary embodiments.

Referring to FIG. 5A, display area 110 of display apparatus 100 is divided into first area A1e and second area A2e. At second area A2e, various user interfaces UI1 through UI11 are disposed for receiving control requests for controlling a motion picture. For example, second area A2e may include user interface UI1 configured to receive a control request signal for starting the playback of the motion picture, user interface UI2 configured to receiving a control request signal for pausing the playback of the motion picture, user interface UI3 configured to receive a control request signal for fast-forwarding the motion picture, user interface UI4 configured to receive a control request signal for rewinding the motion picture, user interface UI5 configured to receive a control request signal for stopping the playback of the motion picture, user interfaces UI6 and UI7 configured to receive a control request signal for selecting certain playback points within the entire track, user interfaces UI8 and UI9 configured to receive a control request signal for adjusting brightness, and user interfaces UI10 and UI11 configured to receive a control request signal for adjusting volume. Various user interfaces UI1 through U11 may have shapes difference from those shown in FIG. 5A. The second area A2e may omit some of various user interfaces UI1 through U11 shown in FIG. 5A, and/or further include additional user interfaces configured to receive a control request signal for performing functions other than those shown in FIG. 5A. First area A1e and second area A2e may have shapes different from those shown in FIG. 5A.

Referring to FIG. 5B, display area 110 of display apparatus 100 is divided into first area A1f and second area A2f. A user may control a motion picture via performing touch operations corresponding to touch input signals to second area A2f. For example, as shown in FIG. 5B, a dragging touch operation in a direction may be a control signal for starting the playback of a motion picture or rewinding the motion picture. Furthermore, touch operations including tapping, double-tapping, and dragging in a particular direction may be control signals for controlling a motion picture. Same touch operations may be different control signals for controlling a motion picture in connection with respective touch starting points and/or a playback state of a motion picture.

Figure 6:
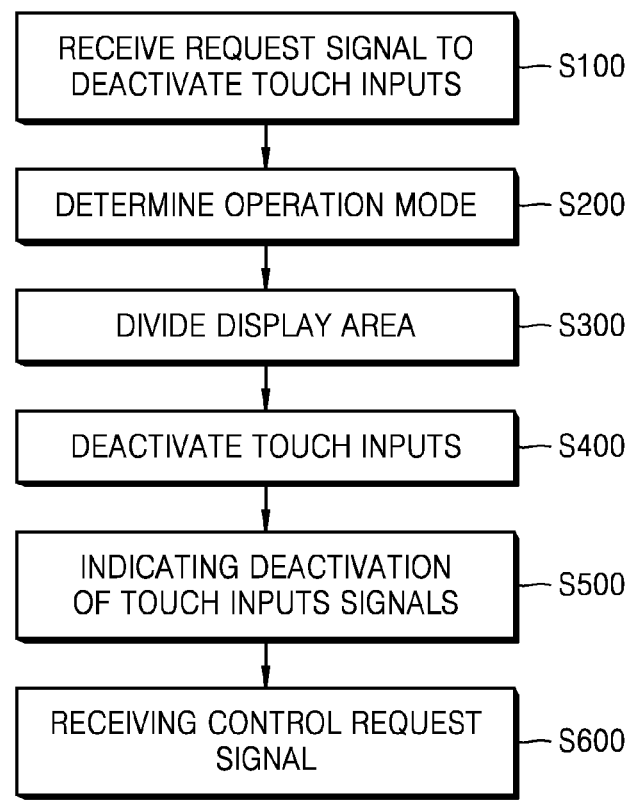
FIG. 6 is a flowchart schematically showing a method of controlling a display apparatus, according to one or more exemplary embodiments.

FIG. 6 is a flowchart schematically showing a method of controlling a display apparatus, according to one or more exemplary embodiments.

Referring to FIG. 6, a display apparatus according to the exemplary embodiments is configured to receive a request signal to deactivate touch input signals (operation S100). The request to deactivate touch input signals may be a deactivation request signal to deactivate touch input signals with respect to a first area when the operation mode of the display apparatus is the motion picture playback mode. The request to deactivate touch input signals may be a global deactivation request signal to deactivate touch input signals with respect to an entire display area regardless of the operation mode of the display apparatus.

Next, an operation mode of the display apparatus is determined (operation S200). Operation modes of the display apparatus may include the motion picture playback mode in which a motion picture is being played back, and the non-motion picture playback mode in which no motion picture is being played back.

Next, the display area of the display apparatus is divided (operation S300). The display apparatus may divide the display area of the display apparatus into a first area and a second area. The first area and the second area may be areas having various shapes.

Next, touch input signals are deactivated (operation S400). If a deactivation request signal is received and the display apparatus is in the motion picture playback mode, the display apparatus is configured to deactivate touch input signals with respect to the first area. If a global deactivation request signal is received, the display apparatus is configured to deactivate touch input signals with respect to an entire display area regardless of the operation mode of the display apparatus.

A method of controlling a display apparatus according to the exemplary embodiments may include indicating deactivation of touch input signals based on a signal from the input receiving unit. (S500) It may be configured to indicate the deactivation of touch input signals based on determining that the operation mode is the non-motion picture playback mode, and to not indicate the deactivation of touch input signals based on determining that the operation mode is the motion picture playback mode.

A method of controlling a display apparatus according to the exemplary embodiments may include receiving a control request signal via touch input signals with respect to the second area. (S600) The control request signal may include at least one of control request signals including volume adjustment, brightness adjustment, starting of playback, pausing of playback, stopping of playback, fast-forwarding, and rewinding received via the control request signal.

According to the one or more exemplary embodiments, display apparatuses and methods of controlling the same may be configured to reduce or prevent interruption from unintended touch operations during playback of the motion picture.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display apparatus comprising:
   a display panel; and
   a display control circuit comprising:
   a request receiving unit configured to receive a deactivation request signal to deactivate touch input signals;
   an area distinguishing unit configured to divide a display area of the display panel into a first area and a second area;
   a mode determining unit configured to determine whether an operation mode of the display apparatus is:
   a motion picture playback mode in which a motion picture is being displayed on both of the first and second areas; or
   a non-motion picture playback mode in which a non-motion picture is being displayed on both of the first and second areas; and
   an input receiving unit configured to process touch operations based on the association from the area distinguishing unit, the operation mode of the display apparatus, and the deactivation request signal,
   wherein the input receiving unit is configured to deactivate the touch input signals on the first area and activate the touch input signals on the second area, based on the deactivation request signal and a signal from the mode determining unit indicating the operation mode is the motion picture playback mode, and
   wherein the input receiving unit is configured to deactivate the touch input signals on both of the first and second areas, based on the deactivation request signal and a signal from the mode determining unit indicating the operation mode is the non-motion picture playback mode.

2. The display apparatus of claim 1, wherein the input receiving unit is configured to deactivate a button displayed on the display panel, based on the deactivation request signal and the signal from the mode determining unit indicating the operation mode is the motion picture playback mode.

3. The display apparatus of claim 1, further comprising a notification unit configured to produce an indication of deactivation of touch input signals based on a signal from the input receiving unit, wherein the notification unit is configured to be deactivated based on a determination that the operation mode is the motion picture playback mode.

4. The display apparatus of claim 1, wherein the first area is an area within a first distance from each edges of the display area, and
the second area is a rectangular area that is located disposed at the center of the display area and does not overlapping the first area.

5. The display apparatus of claim 1, wherein the first area comprises an area within a second distance from the upper edge of the display area and an area within the second distance from the lower edge of the display area, and
the second area is a rectangular area disposed at the center of the display area and not overlapping the first area.

6. The display apparatus of claim 1, wherein the display apparatus is configured to receive a designation input signal from the user and divide the first area and the second area according to the received designation input signal.

7. The display apparatus of claim 1, wherein the second area has a rectangular shape,
a side of the second area is disposed on an edge of the display area, and
the first area comprises a portion of the display area other than the second area.

8. The display apparatus of claim 1, wherein the second area has an elliptical shape disposed at the center of the display area, and
the first area comprises a portion of the display area other than the second area.

9. The display apparatus of claim 1, wherein the input receiving unit is configured to receive a control request signal via touch input signals with respect to the second area, and
the input receiving unit is configured to receive at least one of control request signals comprising volume adjustment, brightness adjustment, starting of playback, pausing of playback, stopping of playback, fast-forwarding, and rewinding via the control request signal.

10. The display apparatus of claim 1, wherein the request receiving unit is further configured to receive a global deactivation request signal, and
the input receiving unit is configured to deactivate the touch input signals with respect to the entire display area in response to receiving the global deactivation request signal.

11. The display apparatus of claim 1, wherein the deactivation request signal is generated according to an algorithm of the display apparatus, when no touch input signal is received for a period of time after playback of the motion picture.

12. A method of controlling a display apparatus including a display panel, the method comprising:
receiving a deactivation request signal to deactivate touch input signals;
dividing a display area of the display panel into a first area and a second area;
determining whether an operation mode of the display apparatus is:
a motion picture playback mode in which a motion picture is being displayed on both of the first and second areas; or
a non-motion picture playback mode in which a non-motion picture is being displayed on both of the first and second areas;
deactivating the touch input signals on the first area and activating the touch input signals on the second area when the operation mode of the display apparatus is the motion picture playback mode; and
deactivating the touch input signals on both of the first and second area when the operation mode of the display apparatus is the non-motion picture playback mode,
wherein the display apparatus is configured to deactivate touch input signals by processing touch operations based on the association from the display area, the operation mode, and the request signal.

13. The method of claim 12, wherein the display apparatus is configured to deactivate the touch input signals with respect to the entire display area in response to receiving a global deactivation request signal.

14. The method of claim 12, further comprising:
indicating deactivation of touch input signals based on a touch signal received,
wherein the display apparatus is configured to deactivate the indicating deactivation of touch input signals in response to determination that the operation mode is the motion picture playback mode.

15. The method of claim 12, wherein the first area is an area within a first distance from each edges of the display area, and
the second area is a rectangular area disposed at the center of the display area and not overlapping the first area.

16. The method of claim 12, wherein the display apparatus is configured to receive a designation input from the user and divide the first area and the second area according to the received designation input.

17. The method of claim 12, wherein the second area has a rectangular shape,
a side of the second area is disposed on an edge of the display area, and
the first area comprises a portion of the display area other than the second area.

18. The method of claim 12, wherein the second area has an elliptical shape disposed at the center of the display area, and
the first area comprises a portion of the display area other than the second area.

19. The method of claim 12, further comprising receiving a control request signal via touch input signals with respect to the second area,
wherein the control request signal may comprise at least one of control requests comprising volume adjustment, brightness adjustment, starting of playback, pausing of playback, stopping of playback, fast-forwarding, and rewinding received via the control request signal.

20. The method of claim 12, further comprising generating the deactivation request signal when no touch input signal is received for a period of time after playback of the motion picture.

* * * * *